US009330074B2

(12) United States Patent
Simonsen et al.

(10) Patent No.: US 9,330,074 B2
(45) Date of Patent: May 3, 2016

(54) STYLE SHEET SPECULATIVE PRELOADING

(71) Applicant: Google Inc., Mountain View, CA (US)

(72) Inventors: James Simonsen, Mountain View, CA (US); Anthony Charles Gentilcore, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 198 days.

(21) Appl. No.: 14/069,311

(22) Filed: Oct. 31, 2013

(65) Prior Publication Data

US 2015/0121198 A1    Apr. 30, 2015

(51) Int. Cl.
*G06F 17/00*    (2006.01)
*G06F 17/22*    (2006.01)
*G06F 17/30*    (2006.01)

(52) U.S. Cl.
CPC ...... *G06F 17/2247* (2013.01); *G06F 17/30902* (2013.01)

(58) Field of Classification Search
None
See application file for complete search history.

(56) References Cited

U.S. PATENT DOCUMENTS

| 2012/0110433 | A1* | 5/2012 | Pan | G06F 17/211 715/234 |
| 2012/0330984 | A1* | 12/2012 | Fablet | G06F 17/2247 707/755 |
| 2013/0073946 | A1* | 3/2013 | Kang | G06F 17/30899 715/234 |
| 2014/0053064 | A1* | 2/2014 | Weber et al. | 715/235 |
| 2014/0129922 | A1* | 5/2014 | Gnech | G06F 17/2247 715/234 |
| 2014/0310392 | A1* | 10/2014 | Ho | H04L 69/16 709/223 |
| 2014/0325345 | A1* | 10/2014 | Vano | G06F 17/211 715/236 |

OTHER PUBLICATIONS

Cascaval, et al., "ZOOMM: A Parallel Web Browser Engine for Multicore Mobile Devices," Principles of Programming Languages, Feb. 23, 2013, vol. 48, No. 8, pp. 271-280.

\* cited by examiner

*Primary Examiner* — Keith Bloomquist
(74) *Attorney, Agent, or Firm* — McDermott Will & Emery LLP

(57) ABSTRACT

Methods for preloading for a web page externally specified resources of a style sheet are provided. In one aspect, a method includes identifying at least one externally specified resource specified by a style sheet for a web page during download of at least one of the style sheet or the web page. The at least one externally specified resource includes at least one of an image, font, audio data, or video data. The method also includes determining whether the web page includes instructions to load the at least one externally specified resource, and loading the at least one externally specified resource specified by the style sheet for the web page when the determination indicates the web page includes instructions to load the at least one externally specified resource. Systems and machine-readable media are also provided.

17 Claims, 5 Drawing Sheets

STYLE SHEET SPECULATIVE PRELOADING

BACKGROUND

1. Field

The present disclosure generally relates to the transmission of data over a network, and more particularly to the use of a computing device to load data communicated over a network.

2. Description of the Related Art

Web pages that are commonly loaded in web browsers often include links to scripts (e.g., JavaScript) and style sheets (e.g., Cascading Style Sheets or "CSS"). Style sheets include style information and/or rules for multiple web pages and for multiple computing platforms. When a web browser begins downloading a web page that may include a link to a script, the web browser, and more particularly a Hypertext Markup Language ("HTML") parser, begins parsing through the web page and pauses when encountering a linked script (or a style sheet upon which the script depends) to load and execute before resuming parsing. While the HTML parser waits, a HTML pre-load scanner may continue to parse ("speculative parsing") through the web page as it loads without pausing in order to identify and initiate loading of any externally specified resources in the HTML, such as style sheets, images, fonts, audio, or video.

When the web browser begins downloading a style sheet identified in a web page that is being loaded, the web browser, and more particularly a style sheet pre-load scanner, begins parsing through the style sheet as it is loaded. The style sheet pre-load scanner, however, is limited to downloading other style sheets that are linked to in the style sheet being loaded and parsed. In addition to other style sheets, the style sheet being loaded and parsed may also link to other externally specified resources, such as images, that are needed by the web page but that will not begin loading by the web browser until after the web page has completed downloading in the web browser.

SUMMARY

According to certain embodiments of the present disclosure, a computer-implemented method for preloading for a web page externally specified resources of a style sheet is provided. The method includes identifying at least one externally specified resource specified by a style sheet for a web page during download of at least one of the style sheet or the web page. The at least one externally specified resource includes at least one of an image, font, audio data, or video data. The method also includes determining whether the web page includes instructions to load the at least one externally specified resource, and loading the at least one externally specified resource specified by the style sheet for the web page when the determination indicates the web page includes instructions to load the at least one externally specified resource.

According to certain embodiments of the present disclosure, a system for preloading for a web page externally specified resources of a style sheet is provided. The system includes a memory that includes instructions, and a processor. The processor is configured to execute the instructions to identify at least one externally specified resource specified by a style sheet for a web page after the web page begins downloading and before the style sheet completes downloading. The at least one externally specified resource includes at least one of an image, font, audio data, or video data. The processor is also configured to execute the instructions to determine whether the web page includes instructions to load the at least one externally specified resource, and load the at least one externally specified resource specified by the style sheet for the web page when the determination indicates the web page includes instructions to load the at least one externally specified resource.

According to certain embodiments of the present disclosure, a machine-readable storage medium that includes machine-readable instructions for causing a processor to execute a method for preloading for a web page externally specified resources of to style sheet is provided. The method includes identifying at least one class or identifier associated with an externally specified resource specified by a style sheet for a web page after the web page begins downloading and before the style sheet completes downloading. The at least one externally specified resource includes at least one of an image, font, audio data, or video data. The method also includes determining whether the web page includes instructions to load the at least one class or identifier, and loading the at least one externally specified resource specified by the style sheet for the web page when the determination indicates the web page includes instructions to load the at least one externally specified resource.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides for the speculative preloading of externally specified resources in a style sheet needed for a web page while both the style sheet and the web page are downloaded, thereby permitting the we page and its style elements to be loaded more quickly in a web browser. Specifically, a web browser as disclosed herein includes a style sheet pre-load scanner configured to receive, from either a HTML parser or a HTML pre-load scanner, an identification of externally specified resources for a style sheet that are needed for a web page being downloaded in the web browser, and is then configured to begin downloading the externally specified resources in parallel with the web page and/or the style sheet being downloaded.

This may occur, for example, where the HTML parser or the HTML pre-load scanner identifies the externally specified resources for the style sheet needed for a web page before the externally specified resources for the style sheet are identified in the style sheet by the style sheet pre-load scanner (e.g., when the web page completes downloading before the style sheet completes downloading), in which case the style sheet pre-load scanner begins downloading the externally specified resources for the style sheet as the style sheet pre-load scanner identifies them based on information provided by the HTML parser or the HTML pre-load scanner during the download of the style sheet. This may also occur, for example, where the style sheet pre-load scanner has identified all of the externally specified resources for a style sheet before the HTML parser or the HTML pre-load scanner has identified the externally specified resources for the style sheet that are needed for a web page (e.g., when the style sheet completes downloading before the web page completes downloading), in which case the style sheet pre-load scanner may begin downloading externally specified resources for the style sheet needed for the web page as they are identified by the HTML parser or the HTML pre-load scanner while the web page is still being downloaded.

Figure 1:
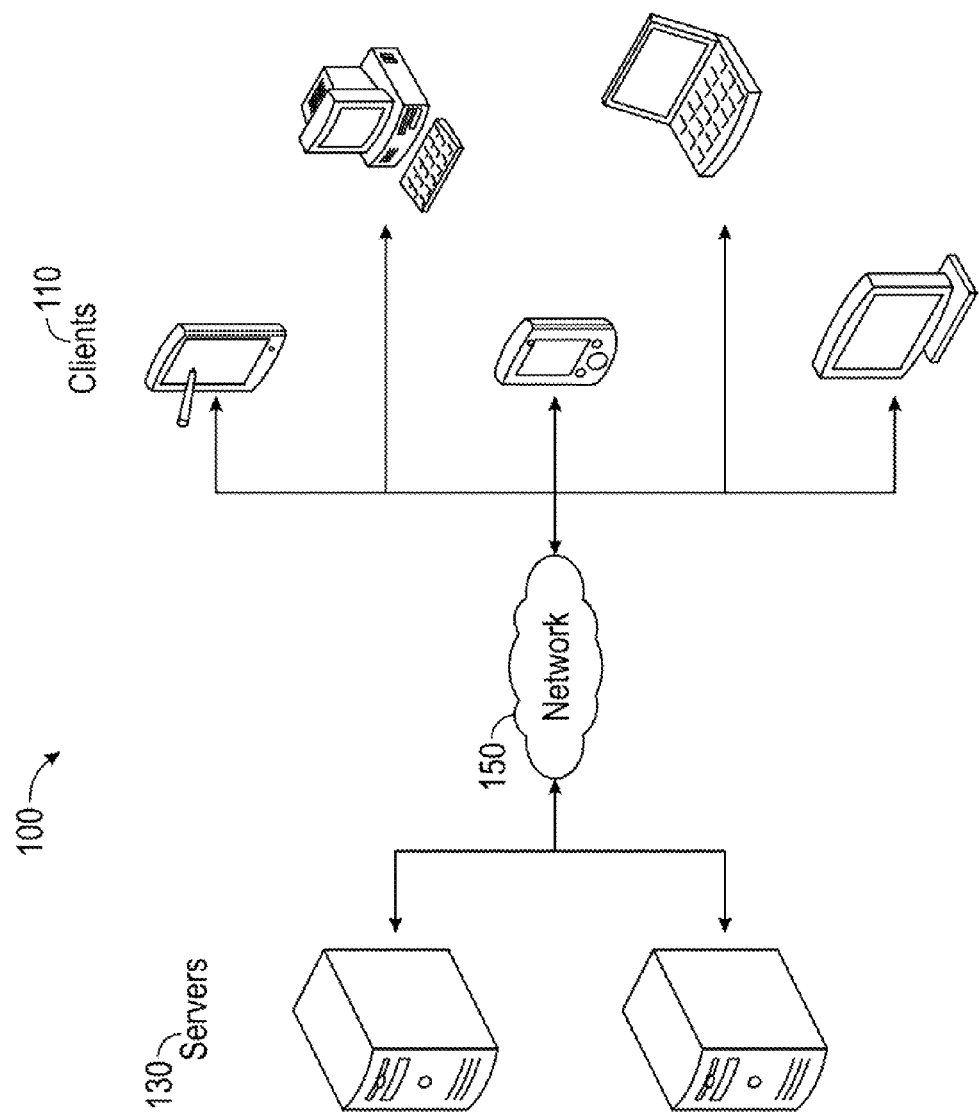
FIG. 1 illustrates an example architecture for preloading for a web page externally specified resources of a style sheet.

FIG. 1 illustrates an example architecture 100 for preloading for a web page externally specified resources of a style sheet. The architecture 100 includes servers 130 and clients 110 connected over a network 150.

Each of the clients 110 is configured to load and execute an application for displaying content, and particularly web pages, which is downloaded over a network 150. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each client 110 is configured to download a web page from one or many of the servers 130 to which the clients 110 are connected over the network 150. The servers 130, in turn, are configured to host the web pages for downloading, and as well as host data associated with the web pages needed to properly display the web pages, such as style sheets, images, fonts, audio, or video. For purposes of load balancing, multiple servers 130 can host the web pages and associated data, either by replication of the entire data or parts of the data. The servers 130 can be any device having an appropriate processor, memory, and communications capability for hosting the web pages and associated data.

The application for each of the clients 110 is configured to begin downloading a web page from one of the servers 130, and then begin parsing the web page. If the web page links to associated data for the web page on one of the servers 130, such as a style sheet, the application begins downloading and parsing the style sheet. The application then identifies if the style sheet links to other associated data, such as images, fonts, audio, video, or other style sheets, and determines whether the other associated data is required by the web page being downloaded in order to properly load and display the web page. If the other associated data that is linked to by the style sheet is required by the web page, the application begins downloading the other associated data while web page and style sheet continue to be downloaded and/or parsed.

Figure 2:
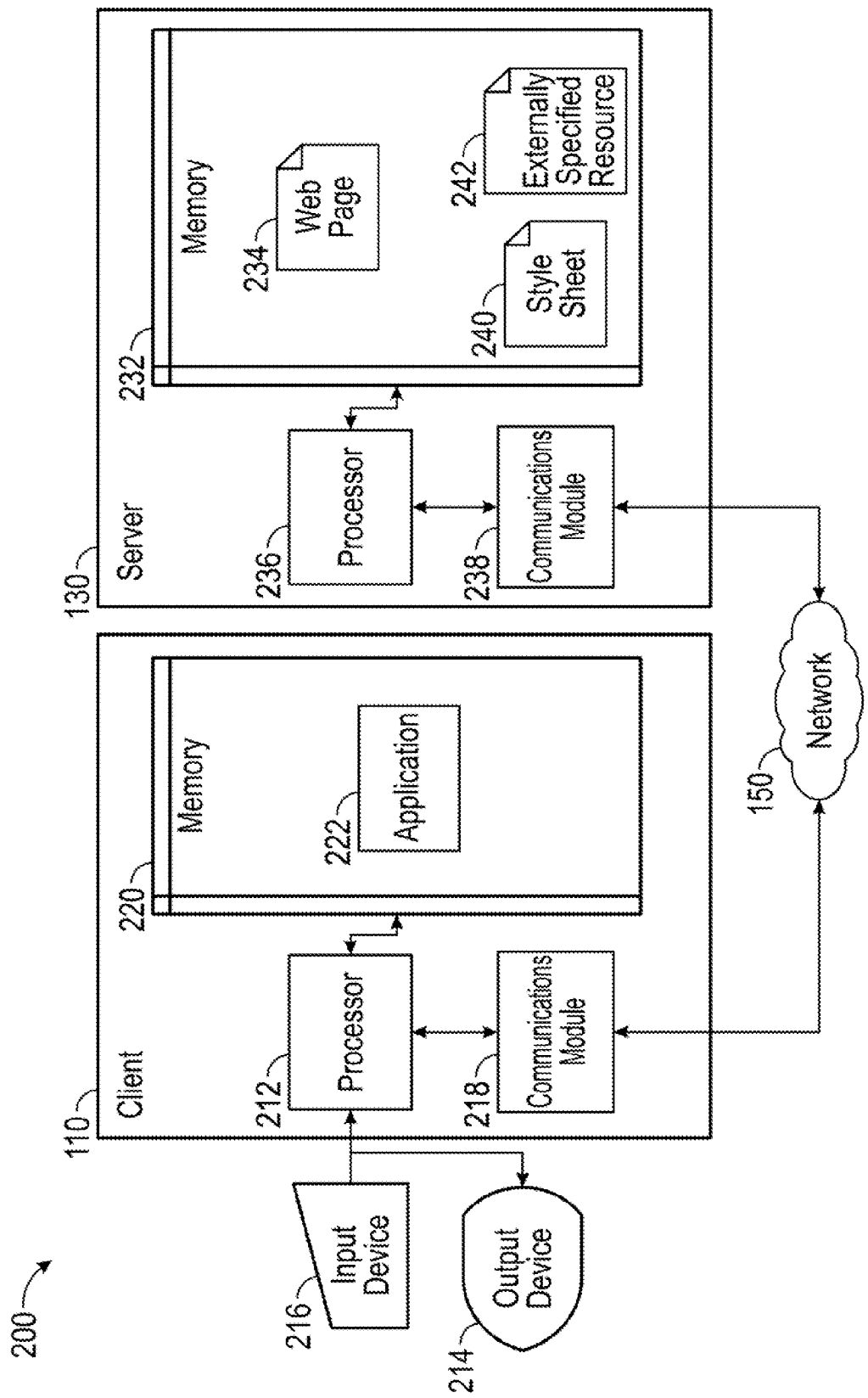
FIG. 2 is a block diagram illustrating the example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network 150. The communications modules 218 and 238 can be, for example, modems or Ethernet cards.

The server 130 includes a processor 236, the communications module 238, and a memory 232. The memory 232 of the server 130 includes a web page 234, style sheet 240 associated with the web page 234, and an externally specified resource 242 specified by the style sheet 240. The style sheet 240 can be, for example, a Cascading Style Sheet (CSS) or Extensible Stylesheet Language (XSL) style sheet. The externally specified resource 242 specified by the style sheet 240 can be, for example, an image, font, audio data, or video data.

The client 110 includes a processor 212, the communications module 218, and a memory 220 that includes an application 222 configured to display the web page 234, such as a web browser. The client 110 also includes an input device 216, such as a keyboard or mouse, and an output device 214, such as a display. The application 222 is configured to instruct the processor 212 to request a copy of the web page 234 from the server 130, and the processor 236 of the server 130 provides a copy of the web page 234 to the client 110 over the network 130 in response to the request.

The application 222 includes a HTML parser, a HTML pre-load scanner, and a style sheet pre-load scanner. The HTML parser is configured to begin parsing the web page 234 as it is downloaded into the memory 220 of the client 110. The HTML parser is configured to pause parsing upon encountering a link to a script (e.g., Javascript) in the web page 234, and resume parsing after the script is downloaded. The HTML pre-load scanner, on the other hand, is configured to speculatively parse the web page 234 without pausing to download linked scripts or other data linked in the web page 234. The HTML pre-load scanner is also configured to instruct the processor 212 to begin downloading data that is linked to in the web page 234 as the HTML pre-load scanner identifies the data during parsing, but without pausing to wait for the data to finish downloading.

For instance, if the HTML pre-load scanner encounters in the web page 234 a link to the style sheet 240, the HTML pre-load scanner instructs the processor 212 to begin downloading the style sheet 240 while the HTML pre-load scanner continues to parse the web page 234. After the style sheet 240 begins downloading into the memory 220 of the client, the style sheet pre-load scanner begins parsing the style sheet 240 to identify, for downloading, one or many externally specified resources 242 that are identified (e.g., by the HTML parser or HTML pre-load scanner) in the web page 234 as being required for download in order for the web page 234 to be properly displayed in the application 222.

The processor 212 of the client 110 is configured to execute instructions, such as instructions physically coded into the processor 212, instructions received from software (e.g., the style sheet pre-load scanner of the application 222) in memory 240, or a combination of both, for preloading for the web page 234 at least one externally specified resource 242 of the style sheet 240. For example, the processor 212 of the client 110 executes instructions to identify at least one externally specified resource 242 specified by the style sheet 240 for the web page 234 during download of at least one of the style sheet 240 or the web page 234.

The identification of the externally specified resource 242 specified by the style sheet 240 for the web page 234 can include, for instance, identifying at least one class or identifier (ID) associated with the externally specified resource 242. For example, the style sheet 240 may include a CSS class or CSS ID that links to the externally specified resource 242. The identification of the externally specified resource 242 specified by the style sheet 240 for the web page 234 can also include, for instance, identifying selectors such as type, attribute, language or visited status associated with the externally specified resource 242. In certain aspects, the identification by the processor 212 of the externally specified resource 242 specified by the style sheet 240 for the web page 234 may occur after the web page 234 begins downloading, but before the style sheet 240 completes downloading. For example, the style sheet pre-load scanner begins instructing the processor 212 to scan the style sheet 240 to identify externally specified resources 242 as soon as the style sheet 240 begins downloading.

The processor 212 of the client 110 is also configured (e.g., by the style sheet pre-load scanner) to determine whether the web page 234 includes instructions to load the externally specified resource 242. For instance, the processor 212 of the client 110 is configured to determine whether the web page 234 includes instructions to load the externally specified resource 242 by receiving an indicator of an element for which the web page 234 comprises instructions to load, and then determining whether the element is associated with the externally specified resource 242. The element can be, for example, a class or identifier. The indicator of the element can be received, for example, from either of the HTML parser or the HTML pre-load scanner. The indicator of the element for which the web page comprises instructions to load can be received, for example, while the web page 234 is being downloaded.

For instance, as the web page 234 is being downloaded, the HTML pre-load scanner may scan the web page 234 and determine that the web page 234 includes instructions calling for a particular class element specified in the style sheet 240. The HTML pre-load scanner may indicate to the style sheet pre-load scanner that the particular class element specified in the style sheet 240 is needed to display the web page 234 in the application, and the style sheet pre-load scanner may then determine whether that a class or id specifying the element is present in the style sheet 240 and if the element is indicated, begin downloading any externally specified resource 242 associated with the element. As such, the processor 212 is configured to load (e.g., download or otherwise load into the memory 220 of the client 110) the externally specified resource 242 specified by the style sheet 240 for the web page 234 when the determination whether the web page 234 includes instructions to load the externally specified resource 242 indicates that the web page 234 includes instructions to load the externally specified resource 242.

In certain aspects, the processor 212 is also configured to construct a Document Object Model (DOM) and render tree while the web page 234 is being downloaded. In such instances, determining whether the web page 234 includes instructions to load the externally specified resource 242 is achieved by analyzing at least one of the DOM or render tree to determine whether the DOM or render tree includes instructions to load the externally specified resource 242.

Figure 3:
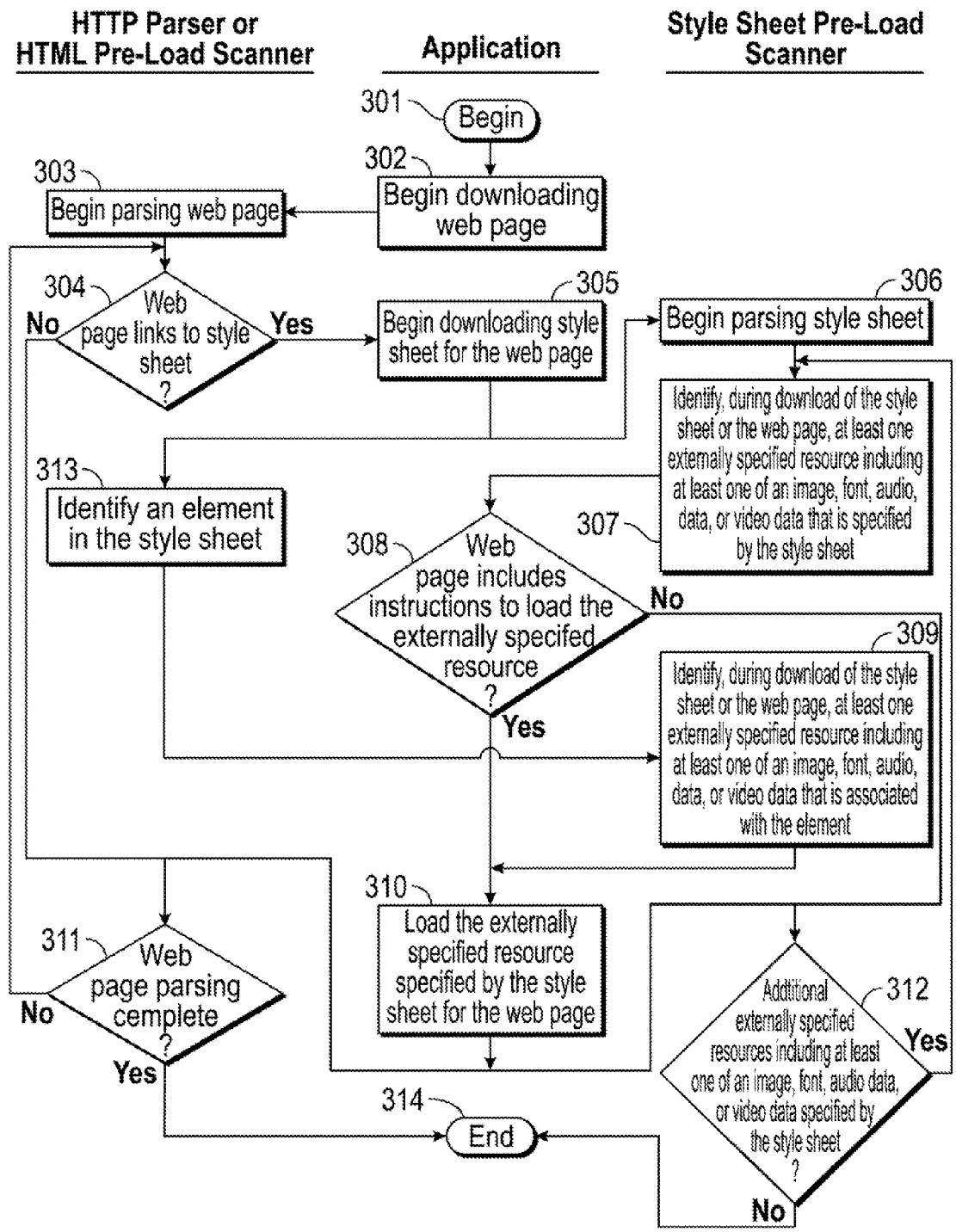
FIG. 3 illustrates an example process for preloading for a web page externally specified resources of a style sheet using the example client of FIG. 2.

FIG. 3 illustrates an example process 300 for preloading for a web page externally specified resources of a style sheet using the example client 110 of FIG. 2. While FIG. 3 is described with reference to FIG. 2, it should be noted that the process steps of FIG. 3 may be performed by other systems.

The process 300 begins by proceeding from beginning step 301 when the application 222 receives a request to load a web page 234 from a server 130, to step 302 when the application 222 begins downloading the web page 234 into the memory 220 of the client 110. In step 303, the HTML parser and/or the HTML pre-load scanner begins parsing the web page 234 as it is downloaded into the memory 220 of the client 110. During parsing, a determination is made in decision step 304 whether the web page 234 links to a style sheet (e.g., style sheet 240 in the memory 232 on the server 130). If the determination of decision step 304 indicates that the web page does not link to a style sheet, the process 300 jumps to decision step 311 to determine whether parsing of the web page 234 is complete. If, however, the determination of decision step 304 indicates that the web page does link to a style sheet, the process 300 proceeds to step 305, in which the application 222 begins downloading the style sheet 240 for the web page 234 (e.g., from the server 130). The process 300 then continues in parallel as the style sheet pre-load scanner begins parsing the style sheet 240 in step 306, as it is downloaded into the memory 220 of the client 110, and the HTML parser and/or the HTML pre-load scanner continues parsing the web page 234 to identify in step 313 an element (e.g., associated with style sheet 240).

Proceeding from step 305 with the style sheet pre-load scanner, in step 307, the style sheet pre-load scanner identifies, during download of the style sheet 240 and/or the web page 234, at least one externally specified resource 242, specified by the style sheet 240, which includes at least one of an image, font, audio data, or video data. The application 222 in decision step 308 determines whether the web page 234 includes instructions to load the externally specified resource 242. If the determination of decision step 308 indicates the web page 234 includes instructions to load the externally specified resource 242, the process 300 proceeds to step 310 in which the externally specified resource 242 is loaded (e.g., downloaded) by the application 222 into the memory 220 of the client 110, and then to decision step 312. If, however, the determination of decision step 308 indicates the web page 234 does not include instructions to load the externally specified resource 242, the process 300 proceeds directly to decision step 312, in which the style sheet pre-load scanner determines whether there are additional externally specified resources including at least one of an image, font, audio data, or video data specified by the style sheet 240. From decision step 312, if the determination indicates that there are additional externally specified resources specified by the style sheet 240, the process 300 returns to step 307, otherwise the process 300 ends in step 314.

Returning to step 305 and proceeding with the HTML parser and/or the HTML pre-load scanner, after the process 300 in step 313 identifies in step 313 an element (e.g., associated with style sheet 240), the process 300 proceeds to step 309 in which the style sheet pre-load scanner identifies, during download of the style sheet 240 and/or the web page 234, at least one externally specified resource 242 associated with the element of step 313 identified by the HTML parser and/or the HTML pre-load scanner, the externally specified resource 242 including at least one of an image, font, audio data, or video data. Then in step 310, the application loads the externally specified resource 242, and subsequently in decision step 311 a determination is made whether the web page parsing (e.g., by the HTML parser and/or the HTML pre-load scanner) is complete. If the determination in decision step 311 indicates the web page parsing is not complete, the process 300 returns to step decision step 304, otherwise the process 300 ends in step 314.

Figure 4:
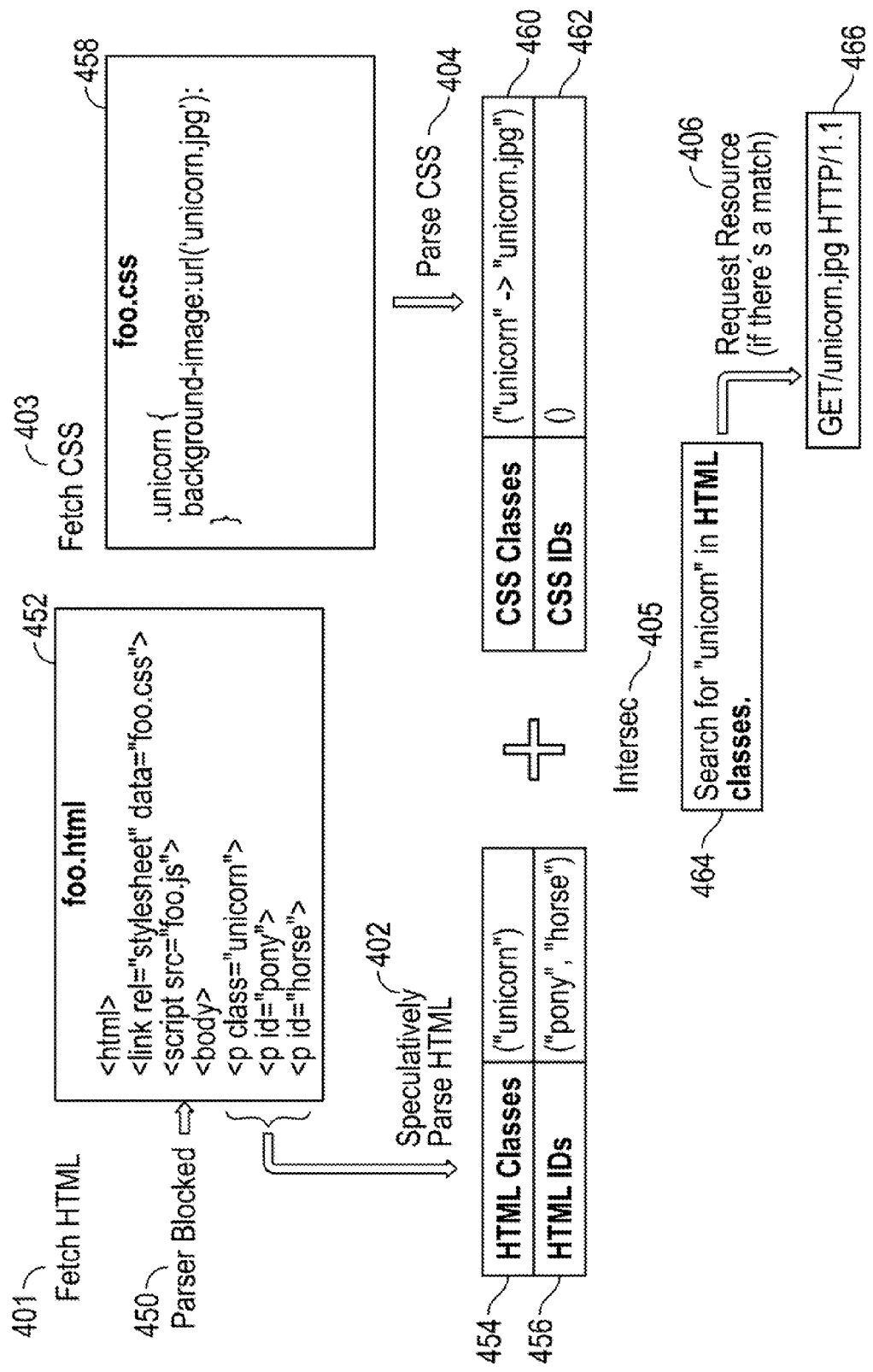
FIG. 4 is an example illustration associated with the example process of FIG. 3.

FIG. 3 set forth an example process 300 for preloading for a web page externally specified resources of a style sheet using the example client 110 of FIG. 2. An example will now be described using the example process 300 of FIG. 3, an application 222 that is a web browser, a style sheet 240 that is a CSS file, an externally specified resource 242 that is an image, and the example illustration 400 of FIG. 4.

The process 300 begins by proceeding from beginning step 301 when a user of the client 110 requests the web browser 222 to load a web page 234 "foo.html" 452 from a server 130, to step 302 when the web browser 222 begins downloading (or fetching 401) the web page 234 "foo.html" 452 into the memory 220 of the client 110. In step 303, the HTML parser begins parsing the web page 234 "foo.html" 452 as it is downloaded into the memory 220 of the client 110, and in decision step 304 determines that the web page 234 links to a style sheet, "foo.css". The process 300 then proceeds to step 305 in which the web browser begins downloading (or fetching 403) the style sheet "foo.css" 458 from the server 130. The process 300 continues as the HTML parser continues parsing the web page 234 "foo.html" 452 until the HTML parser encounters a tag to load a script file, "foo.js", at which point the HTML parser is blocked 450. The HTML pre-load scanner, however, continues parsing and in step 313 identifies elements, namely an HTML class "unicorn" (i.e., <p class="unicorn">) 454 and HTML identifiers "pony" and "horse" (i.e., <p id="pony"> and <p id="horse">) 456, associated with the style sheet "foo.css" 458.

The process 300 continues in parallel as the HTML pre-load scanner continues parsing, with the style sheet pre-load scanner beginning parsing 404 the CSS file 240 in step 306 as CSS file 240 is downloaded into the memory 220 of the client 110. In step 307, the style sheet pre-load scanner identifies, during download of the CSS file 240 and the web page 234, an externally specified resource 242 "unicorn.jpg" that is specified by the CSS file 240, particularly CSS class "unicorn" 460 and a blank CSS identifier 466.

At about the same time, returning to the HTML pre-load scanner, the HTML pre-load scanner identifies the elements, the HTML class "unicorn" (i.e., <p class="unicorn">) 454 and HTML identifiers "pony" and "horse" (i.e., <p id="pony"> and <p id="horse">) 456, associated with the style sheet "foo.css" 458 to the style sheet pre-load scanner, and intersects 405 with the style sheet pre-load scanner, which in step 309 searches 464 and identifies (i.e., matches 406), during download of the style sheet 240 and the web page 234, the externally specified resource 242 "unicorn.jpg" that is associated with the elements. Then in step 310, the application loads the externally specified resource 242 "unicorn.jpg" (e.g., using a "GET /unicorn.jpg HTTP/1.1" 466 command). Subsequently in decision step 311 a determination is made that the web page parsing (e.g., by the HTML parser and the HTML pre-load scanner) is complete, and the process ends in step 314.

Figure 5:
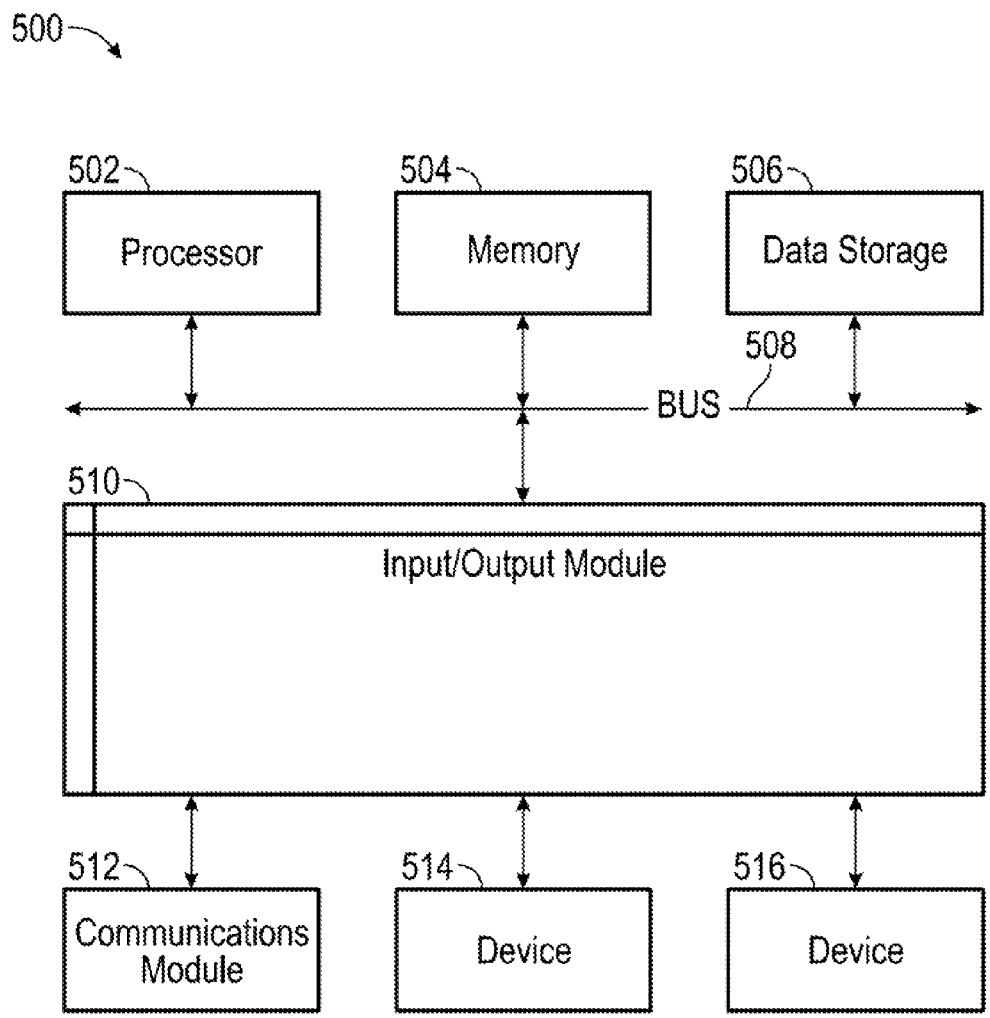
FIG. 5 is a block diagram illustrating an example computer system with which the client and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), to broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, to flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or inure of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for preloading for a web page externally specified resources of a style sheet, the method comprising:
identifying each externally specified resource specified by a style sheet for a web page after completing download of the style sheet and prior to completion of download of the web page, each externally specified resource comprising at least one of an image, font, audio data, or video data, and the style sheet and the web page being separate files;
constructing a Document Object Model (DOM) and render tree while the web page is being downloaded;
determining whether the web page includes instructions to load the at least one externally specified resource by comparing the render tree as the render tree is constructed while the web page is being downloaded against each externally specified resource from the completed download of the style sheet for the web page to determine whether the render tree includes instructions to load at least one of the externally specified resources, and
loading the at least one externally specified resource specified by the style sheet for the web page when the determination indicates the web page includes instructions to load the at least one externally specified resource.

2. The method of claim 1, wherein the style sheet comprises a Cascading Style Sheet (CSS).

3. The method of claim 1, wherein determining whether the web page includes instructions to load the externally specified resource comprises:
receiving an indicator of an element for which the web page comprises instructions to load; and
determining whether the element is associated with the at least one externally specified resource.

4. The method of claim 3, wherein the element comprises a class or identifier.

5. The method of claim 3, wherein the indicator of the element is received from at least one of an Hypertext Markup Language ("HTML") parser or a HTML pre-load scanner.

6. The method of claim 3, wherein the indicator of the element for which the web page comprises instructions to load is received while the web page is being downloaded.

7. The method of claim 1, wherein identifying the at least one externally specified resource specified by the style sheet comprises identifying at least one class or identifier associated with the at least one externally specified resource.

8. The method of claim 7, wherein identifying the at least one externally specified resource specified by the style sheet further comprises identifying at least one type, attribute, language or visited status associated with the at least one externally specified resource.

9. A system for preloading for a web page externally specified resources of a style sheet, the system comprising:
a memory comprising instructions, and
a processor configured to execute the instructions to:
identify each externally specified resource specified by a style sheet for a web page after completing download of the style sheet and prior to completion of download of the web page begins, the at least one externally specified resource comprising at least one of an image, font, audio data, or video data, and the style sheet and the web page being separate files;
construct a Document Object Model (DOM) and render tree while the web page is being downloaded;
determine whether the web page includes instructions to load the at least one externally specified resource by comparing the render tree as the render tree is constructed while the web page is being downloaded against each externally specified resource from the completed download of the style sheet for the web page to determine whether the render tree includes instructions to load at least one of the externally specified resources; and
load the at least one externally specified resource specified by the style sheet for the web page when the determination indicates the web page includes instructions to load the at least one externally specified resource.

10. The system of claim 9, wherein the style sheet comprises a Cascading Style Sheet (CSS).

11. The system of claim 9, wherein the processor being configured to execute the instructions to determine whether the web page includes instructions to load the externally specified resource comprises the processor being configured to execute the instructions to:
  receive an indicator of an element for which the web page comprises instructions to load, and
  determine whether the element is associated with the at least one externally specified resource.

12. The system of claim 11, wherein the element comprises a class or identifier.

13. The system of claim 11, wherein the indicator of the element is received from at least one of an Hypertext Markup Language (HTML) parser or a HTML pre-load scanner.

14. The system of claim 11, wherein the indicator of the element for which the web page comprises instructions to load is received while the web page is being downloaded.

15. The system of claim 9, wherein the processor being configured to execute the instructions to identify the at least one externally specified resource specified by the style sheet comprises the processor being configured to execute the instructions to identify at least one class or identifier associated with the at least one externally specified resource.

16. The system of claim 15, wherein the processor being configured to execute the instructions to identify the at least one externally specified resource specified by the style sheet further comprises the processor being configured to execute the instructions to identify at least one type, attribute, language or visited status associated with the at least one externally specified resource.

17. A non-transitory machine-readable storage medium comprising machine-readable instructions for causing a processor to execute a method for preloading for a web page externally specified resources of a style sheet, the method comprising:
  identifying each class or identifier associated with an externally specified resource specified by a style sheet for a web page after completing download of the style sheet and prior to completion of download of the web page, the at least one externally specified resource comprising at least one of an image, font, audio data, or video data, and the style sheet and the web page being separate files;
  constructing a Document Object Model (DOM) and render tree while the web page is being downloaded;
  determining whether the web page includes instructions to load the at least one class or identifier by comparing the render tree as the render tree is constructed while the web page is being downloaded against each externally specified resource from the completed download of the style sheet for the web page to determine whether the render tree includes instructions to load at least one of the externally specified resource; and
  loading the at least one externally specified resource specified by the style sheet for the web page when the determination indicates the web page includes instructions to load the at least one externally specified resource.

* * * * *